United States Patent [19]
Webb

[11] Patent Number: 4,787,484
[45] Date of Patent: Nov. 29, 1988

[54] ELECTROMAGNETICALLY OPERATED FRICTION BRAKE HAVING AUTOMATIC ADJUSTMENT MECHANISM

[75] Inventor: David J. Webb, Bridgwater, England

[73] Assignee: Torvale Transmissions Limited, Bridgwater, United Kingdom

[21] Appl. No.: 6,414

[22] Filed: Jan. 23, 1987

[30] Foreign Application Priority Data

Jan. 29, 1986 [GB] United Kingdom ............... 8602120

[51] Int. Cl.$^4$ ............................................. B60T 13/04
[52] U.S. Cl. .......................... 188/171; 188/196 BA; 188/79.62
[58] Field of Search .................. 188/196 R, 171, 200, 188/173, 196 B, 196 BA, 79.5 GE, 79.5 GT

[56] References Cited

U.S. PATENT DOCUMENTS

| | | | |
|---|---|---|---|
| 1,835,008 | 12/1931 | Browall | 188/196 R |
| 3,160,240 | 12/1964 | Harding et al. | 188/171 |
| 3,348,639 | 10/1967 | Ames | 188/171 |
| 3,710,897 | 1/1973 | Moody | 188/75 |
| 4,031,987 | 6/1977 | Webb | 188/75 |
| 4,116,308 | 9/1978 | Sever | 188/171 |

FOREIGN PATENT DOCUMENTS

| | | | |
|---|---|---|---|
| 2003951 | 8/1971 | Fed. Rep. of Germany . | |
| 2447172 | 5/1975 | Fed. Rep. of Germany . | |
| 2605355 | 8/1976 | Fed. Rep. of Germany . | |
| 2752926 | 6/1978 | Fed. Rep. of Germany . | |
| 675419 | 2/1930 | France | 188/200 |
| 1068094 | 6/1954 | France . | |
| 2091113 | 1/1972 | France . | |
| 327258 | 4/1930 | Greece . | |
| 693186 | 6/1953 | United Kingdom . | |
| 1096214 | 12/1967 | United Kingdom . | |
| 1213642 | 11/1970 | United Kingdom | 188/171 |
| 1527795 | 10/1978 | United Kingdom . | |
| 1555906 | 11/1979 | United Kingdom . | |

Primary Examiner—Andres Kashnikow
Assistant Examiner—Mark T. Le
Attorney, Agent, or Firm—Kelly, Bauersfeld & Lowry

[57] ABSTRACT

A brake comprises a base on which a pair of brake shoes are mounted, springs to resiliently bias the brake shoes into engagement with a drum which is fixed relative to a rotatable member to be braked, to apply the brake, an electromagnet to move the brake shoes against the springs to release the brake, the electromagnet comprising a coil and an armature movable relative to the coil when the coil is energized, and a lost motion device automatically to maintain the movement of the armature relative to the coil within a predetermined range of movement irrespective of the amount of wear of the brake shoes.

14 Claims, 2 Drawing Sheets

ELECTROMAGNETICALLY OPERATED FRICTION BRAKE HAVING AUTOMATIC ADJUSTMENT MECHANISM

BACKGROUND TO THE INVENTION

This invention relates to a brake and more particularly, to a brake comprising a base on which are mounted a pair of, usually lined, brake shoes which are normally urged by resilient biasing means into engagement with a drum to apply the brake, and are movable against the force of the resilient biasing means by electromagnetic means to release the brake.

It will be appreciated that in use the linings of the brake shoes wear. Where the electromagnetic means comprises an electromagnet having an armature which moves relative to one or more coils of the magnet, as the shoe linings wear, this increases the gap between the armature and the coil, i.e. the magnet armature gap, when the brake is applied, so that the armature has to move from an increasingly greater distance from the coil when the coil is energised. Unless periodically the brake is adjusted to reduce the armature gap, severe wear of the shoe linings can result in the armature lying beyond the range throughout which the coil can attract the armature against the force of the resilient biasing means which tend to apply the brakes and resist movement of the magnetic armature. Thus the brakes cannot be released.

SUMMARY OF THE INVENTION

According to the invention we provide a brake comprising a base on which a pair of brake shoes are mounted, means to normally resiliently bias the brake shoes into engagement with a drum which is fixed relative to a rotatable member to be braked, to apply the brake, electromagnetic means to move the brake shoes against the resilient biasing means to release the brake, the electromagnetic means comprising an electromagnet having a coil and an armature movable relative to the coil when the coil is energised, and means automatically to maintain the movement of the armature relative to the coil within a predetermined range of movement irrespective of the amount of wear of the brake shoes.

Thus the necessity for frequent adjustment of the brake is overcome.

In one embodiment, the brake shoes are each pivotally mounted at or adjacent one end on the base, and the armature of the electromagnet is biased by the resilient biasing means into engagement with one of the shoes whilst a housing of the coil of the electromagnet is resiliently biased by the resilient biasing means relative to the other of the shoes via a connecting element such as a pull rod, so that the shoes are both oppositely biased into engagement with the drum, the means for automatically maintaining the movement of the armature relative to the coil within the predetermined range comprising means automatically to vary the effective length (as herein defined) of the connecting element by an amount corresponding to the amount of wear of the brake shoes.

By "effective length" we mean the fixed distance from the housing to the respective brake shoe. Preferably the connecting element has a screw thread which is engaged with a corresponding screw threaded part, relative rotation between the element and the corresponding screw threaded part varying the effective length of the element.

Preferably the brake shoes are resiliently biased towards one another to apply the brake so that the shoes will engage an outside surface of the drum, although alternatively the brake shoes could be biased apart into engagement with an inside surface of a drum is required.

Where the brake shoes engage the outside surface of the durm, the effective length of the connecting element is automatically reduced as the brake shoes wear, to reduce the separation of the shoes when the brake is released.

In each case, the means to vary the effective length of the connecting element may comprise a lost motion mechanism.

In a preferred embodiment, a first link member is pivotally connected at or adjacent one end to the armature, and at or adjacent the other end the first link member is pivotally connected to a second link member which itself is pivotally secured relative to the coil of the electromagnet, the second link member being rigid with a lever which when rotated at least in one sense of rotation causes the connecting element to rotate relative to the threaded part to thus reduce the effective length of the connecting element.

For example, the lever may operate a peg which is fixed relative to a first part of the lost motion mechanism, a second part of the lost motion mechanism being fixed relative to the connecting element engaged with the threaded part, the first and second parts being freely rotatable only in one sense of rotation such that when the peg is moved by the lever in the opposite sense of rotation the first and second parts move together to cause rotation of the connecting element relative to the threaded part.

The lost motion mechanism may comprise a one way clutch. For example the first part of the clutch may comprise an outer race and the second part an inner race relatively mounted to permit the outer race to free wheel relative to the inner race in one sense of rotation only. The inner race may be rigid with the connecting element.

The threaded part with which the thread of the connecting element is engaged, may comprise a block located at or adjacent the brake shoe to which the connecting element is relatively secured.

The peg which is rigid with the outer race of the lost motion mechanism may be received in a slot in the lever which is rigid with the second link member.

The coil of the electromagnet or the housing in which the coil is fixed, and the armature, may be pivotally secured relative to the base so that when the coil of the electromagnet is energised, the armature acts on one brake shoe and the housing may move relative to the base away from the armature to actuate the other brake shoe via the connecting element.

Means may be provided to ensure that an equal force is applied by each of the brake shoes to the drum, such as a biasing spring preset to adjust the relative position of the brake shoe to which the connecting element is relatively secured, relative to the base.

The brake shoes may comprise carriers which are pivotally mounted on the base of the brake, and liner mounting parts which may be pivotally secured relative to the carriers. Preferably the drum engaging surface of the liner mounting parts i.e. the surface of the liners, is at least partly arcuate so as to correspond with the outer configuration of the drum with which the shoes are engaged.

The brake shoe which is engaged by the armature of the electromagnet, may receive the connecting element, so as to constrain the movement of the first mentioned brake shoe axially of the rotatable member to be braked.

BRIEF DESCRIPTION OF THE DRAWINGS

The invention will now be described with the aid of the accompanying drawings in which.

DESCRIPTION OF THE PREFERRED EMBODIMENTS

Figure 1:
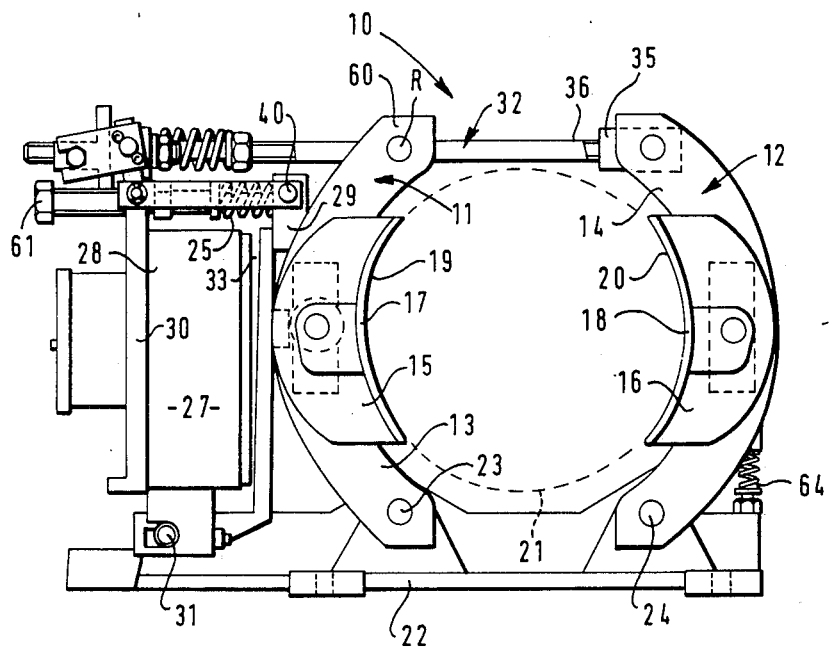
FIG. 1 is a schematic side view of a brake in accordance with the invention.

Referring to the drawings, a brake 10 comprises a pair of brake shoes 11,12, each comprising a carrier 13,14, respectively, on which is pivotally mounted a linear carrying part 15,16, carrying a brake liner 17,18.

The brake liners 17,18, provide drum-engaging surfaces 19,20, which are part arcuate and in use, bear on a drum 21 (shown in dotted lines) which is fixed relative to a shaft, wheel or other rotatable member to be braked.

The carriers 13,14, are each pivotally mounted at their one ends to a base 22 as shown at 23,24, respectively.

The shoes 11,12, are oppositely resiliently biased towards one another into engagement with the drum 21 to apply the brake 10, by compression springs 25,26, the operation of which will be explained below.

An electromagnetic means for releasing the brake 10 is provided and comprises an electromagnet 27 having a housing 28 in which are fixed one or more coils (not seen) and an armature 29 which is movable relative to the housing 28.

The compression springs 25,26, act between a bearing plate 30 of the housing 28 and the armature 29, to urge the armature 29 away from the housing 28.

The housing 28, and hence the coil, and the armature 29 are pivotally secured relative to the base 22 as shown at 31, and the armature 29 bears on the brake shoe 11 to thus urge the shoe 11 into engagement with the drum 21.

The plate 30 is connected by a connecting element 32 to the other brake shoe 12. Because the bearing plate 30 is biased away from the armature 29, the shoe 12 is thus biased towards shoe 11 into engagement with the drum 21, relative movement being permitted by virtue of the pivot connection 31.

When the coil of the electromagnet 27 is energised, the armature 29 will be attracted towards the coil in the housing 28 against the force of the compression springs 25,26.

Thus the brake shoes 11,12, will no longer be urged into engagement with the drum 21, and by virtue of the connecting element 32, which normally acts as a pull rod to pull shoe 12 into engagement with the drum 21, the element 32 will push the shoe 12 from engagement with the drum 21 and hence the brake will be released.

It can be seen that there is a small gap 33 between the armature 29 and the housing 28. Because the compression springs 25,26, need to provide a large force to ensure adequate braking power, the electromagnet 27 needs to develop a high torque to release the brake 10 against the force of the springs 25,26. Hence a short stroke high power D.C. electromagnet 27 is chosen.

It will be appreciated by those skilled in the art that such electro magnets 27 develop maximum torque over only a short range of armature movement. In the brake 10 described, as the shoe linings 17, 18, wear, the gap 33 will tend to increase because when the brake 10 is applied, the carriers 13,14, of the shoes 12 will become closer together. Thus the distance of the armature 29 to the coil of the electromagnet 27 will increase. In conventional such brakes, frequent adjustment of the brake is required to maintain the gap 33 at the correct value for the maximum torque to be developed.

If the wear of the brake linings 17,18, goes unchecked, eventually the gap 33 will increase to such an extent that the coil of the electromagnet 27 will be unable to provide sufficient attraction to move the armature 29 relative to the housing 28 to release the brake 10.

According to the present invention, in order to minimise frequency of adjustment required, a lost motion mechanism is provided automatically to adjust the gap 33 as the brake linings 17,18, wear.

Previously to the present invention, to adjust gap 33, the effective length of the connecting element 32 has been reduced. The connecting element 32 has a male threaded end which is passed through the bearing plate 30 and receives a nut. As the nut is rotated, the distance between the housing 27 and the shoe 12 i.e. the effective length of the element 32, has been reduced.

In the present example of the invention however, the shoe 12 carries a female threaded block 35 and the element 32 has a corresponding male thread at the corresponding end 36.

Thus to reduce the effective length of the element 32, the connecting element 32 itself is rotated to screw the element 32 into the block 35. This rotation of the element 32 is achieved automatically as the brake linings 17,18, wear, by virtue of the lost motion mechanism.

The lost motion mechanism comprises a first link member 38 which is pivotally fixed at one end 39 relative to the armature 29 as shown at 40.

The first link member 38 comprises a rigid bar but any other suitable member could be used.

At its other end 41, the member 39 is pivoted to one end 42 of a second link member 43 as shown at 44, which second link member 43 again comprises a bar.

The other end of the second link member 43 is pivoted relative to the bearing plate 30 and is rigidly secured by fasteners 45 to a lever 46. The lever 46 has at an outer end 47 thereof, a slot 48 which receives a peg 49 which in the present example comprises a bolt which extends radially relative to the axis of rotation of the connecting element 32. Thep peg 49 is received by an axially extending tab 50 fixed to an outer race 51 of a one way clutch. The outer race can free wheel relative to an inner race 53 which is fixed relative to the connecting element 32, in one sense of rotation only. One suitable type of one way clutch is a Stieber one way clutch, such as the model KK17, KK20, KK25, KK30 or KK35.

Figure 2:
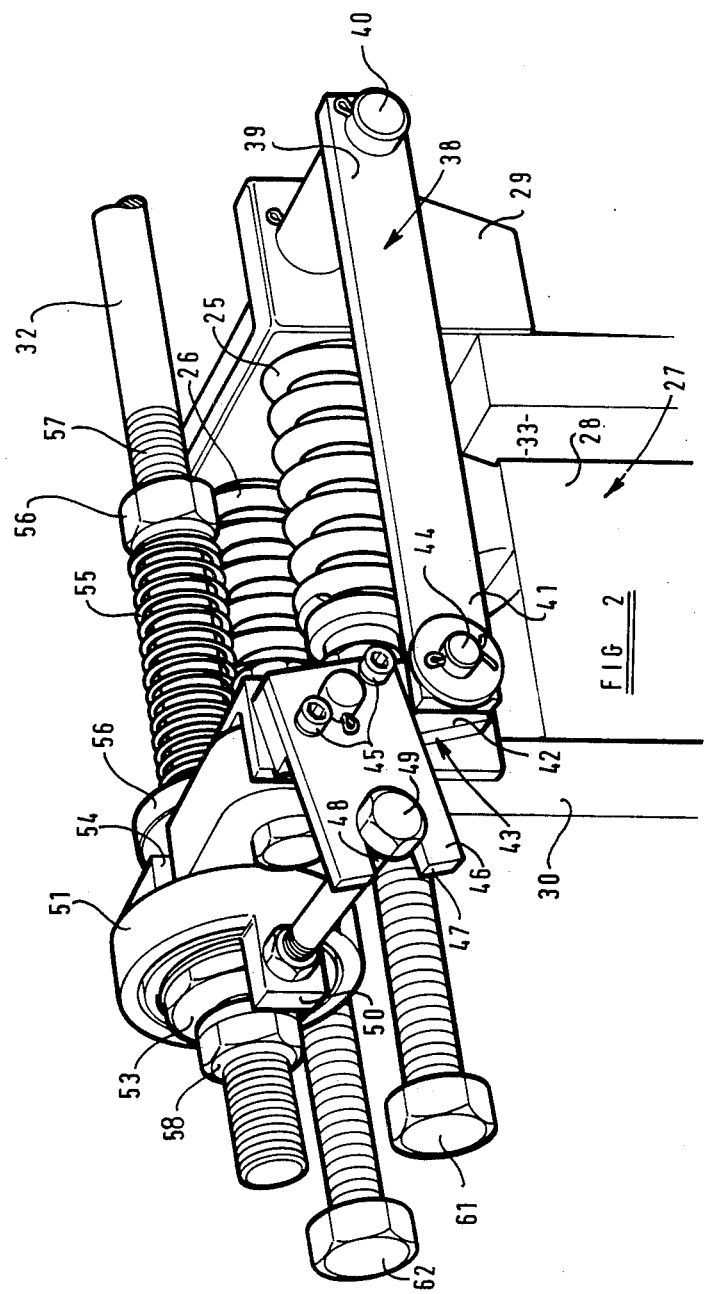
FIG. 2 is a perspective schematic view to an enlarged scale of the lost motion mechanism of the brake of FIG. 1.

It can be seen from FIG. 2 that the connecting element 32 is received in a slot 54 in the bearing plate 30 although alternatively could pass through an opening therein, and the races 51,53, provide a stop to prevent longitudinal movement of the connecting element 32 relative to the bearing plate 30 as the brake is released. To maintain the races 51,53, in engagement with the bearing plate 30, a spring 55 acts between a washer 56 which bears on an opposite side of the bearing plate 30 to the races 51,53, and a stop comprising a nut 56 received on the screw threaded end 57 of the connecting element 32. A further lock nut 58 is provided to lock the inner race 53 relative to the connecting element 32.

It will be appreciated that as the gap 33 between the housing 28 and the armature 29 tends to increase as the shoe linings 17,18, wear, the distance between the armature 29 and the bearing plate 30 will tend to increase. By virtue of the link members 38,43, the lever 46 will be rotated anti-clockwise as seen in the drawings which will move the peg 49 downwardly. This downward movement of the peg 49 will cause the outer race 51 of the one way clutch to turn clockwise. The inner and outer races 53,51, have ratchet means so that when the outer race 51 is moved a predetermined amount the inner race 53 will also rotate clockwise causing turning of the connecting element 32. The connecting element 32 will thus be screwed into the block 35 thus reducing the effective length of the connecting element 32.

This will result in reduction of the gap 33 thus maintaining the distance of the armature 29 relative to the housing 28, and hence the coil, when the brake 10 is applied, within an acceptable predetermined range of attraction of the coil of the electromagnet 27.

Of course, when the electromagnet 27 is operated to release the brake, the distance between the bearing plate 30 and the arm 29 will decrease resulting in upward movement of the lever 46 and anti-clockwise movement of the outer race 51 as seen in the drawings. However, this does not cause anti-clockwise rotation of the inner race 53 and hence connecting element 32 because of the one way clutch ratchet construction and thus no rotation will be imparted to the connecting element 32.

It can be seen from FIG. 1 that the brake shoe 11 has a bifurcated upper end 60 and the connecting element 32 is received between the two limbs of the bifurcated end on a roller R. If desired, the roller R could alternatively be mounted on the armature 29, so that the bifurcated end 60 of shoe 11 simply accommodates the connecting element 32.

Of course, even though the lost motion mechanism described provides for automatic adjustment of the gap 33 as the brake linings 17,18, wear, periodical inspection and adjustment of the brake would still be required as the amount of rotation of the connecting element 32 and hence the shortening of its effective length may not correspond exactly with the amount of brake lining wear, although the automatic adjustment mechanism described will keep the size of the gap 33 within the predetermined operational range for a considerable time thereby lessening the frequency of manual adjustment required with known drum brakes of this type.

The torque applied by the springs 45,46, is adjustable by means of adjusters 61,62 and a manual operating hand control is provided (not shown) to enable the brake to be released manually in the event for example of failure of the electromagnet 27.

The initial setting of the shoes 11,12, is also achieved by presetting a biasing spring 64 so that the shoes 11,12, each engage the drum 21 with a generally equal force when the brake is applied.

Many modifications may be made to the brake described without departing from the scope of the invention. For example, as described, the brake shoes 11,12, both engage the outside of a drum for braking. In another example, the brake shoes may be arranged to be resiliently biased away from one another so as to engage the internal surface of a drum.

If desired, hydraulic means may be provided to enable the brake to be released irrespective of the condition of and in addition to the electromagnet 27. In place of a connecting element 32 which is rotated by the lost motion mechanism to reduce its effective length as brake wear occurs, if desired, a threaded part received on a fixed connecting element may be rotated to reduce the effective length of the connecting element. In this event, some modification to the lost motion mechanism described may be required. Any other lost motion mechanism which causes effective reduction of the length of the connecting element, or otherwise compensates for wear of the brake shoe linings 17,18, could alternatively be provided.

Although as described the electromagnet has a coil, which may comprise a plurality of turns, if desired, more than one coil may be provided which may also comprise a plurality of turns. In each case, the arrangement of the coil or coils are chosen to achieve high torque induction with the selected voltage applied to the coil or coils, sufficient to release the brake against the force of the compression springs 25,26.

I claim:

1. A brake comprising a base, a pair of brake shoes, means mounting the brake shoes on the base, a drum to be braked, means resiliently to bias the brake shoes into engagement with the drum to apply the brake, electromagnetic means to move the brake shoes against the resilient biasing means to release the brake, the electromagnetic means comprising an electromagnet having a coil and an armature movable relative to the coil when the coil is energised, the resilient biasing means biasing the armature of the electromagnet into engagement with one of the shoes whilst a housing of the coil of the electromagnet is resiliently biased in an opposite direction by the resilient biasing means, a connecting element connecting the housing and the other of the brake shoes so that the shoes are both oppositely biased into engagement with the drum, and means automatically to maintain the movement of the armature relative to the coil within a predetermined range of movement irrespective of the amount of wear of the brake shoes, the maintaining means comprising a lost motion mechanism having a one way clutch mounted adjacent to the electromagnet and operated by a linkage means that is mounted to be pivotable on the housing of the coil and on the armature and automatically varying the effective length of the connecting element by an amount corresponding to the amount of wear of the brake shoes.

2. A brake according to claim 1 wherein the connecting element has a screw thread which is engaged with a corresponding screw threaded part, relative rotation between the element and the corresponding screw threaded part varying the effective length of the element.

3. A brake according to claim 2 wherein the linkage means of the lost motion mechanism comprises a first link member pivotally connected at one end to the armature and at the other end of the first link is pivotally connected to a second link member which itself is pivotally secured relative to the coil of the electromagnet, the second link member being rigid with a lever which when rotated at least in one sense of the rotation causes the connecting element to rotate relative to the threaded part to thus reduce the effective length of the connecting element.

4. A brake according to claim 3 wherein the lever operates a peg which is fixed relative to a first part of the lost motion mechanism, a second part of the lost motion mechanism being fixed relative to the connecting element engaged with the threaded part, the first and second parts being freely rotatable only in one sense of rotation such that when the peg is moved by the lever in the opposite sense of rotation the first and second parts move together to cause rotation of the connecting element relative to the threaded part.

5. A brake according to claim 4 wherein the lost motion mechanism comprises a one way clutch, the first part of the clutch comprising an outer race and the second part an inner race relatively mounted to permit the outer race of free wheel relative to the inner race in one sense of rotation only, the inner race being rigid with the connecting element.

6. A brake according to claim 1 wherein the coil of the electromagnet, and the housing thereof in which the coil is fixed, and the armature, are pivotally secured relative to the base so that when the coil of the electromagnet is energised, the armature acts on one brake shoe and the housing moves relative to the base away from the armature to actuate the other brake shoe via the connecting element.

7. A brake according to claim 1 wherein means are provided to ensure that an equal force is applied by each of the brake shoes to the drum, the means comprising a biasing spring preset to adjust the relative position of the brake shoe to which the connecting element is relatively secured, relative to the base.

8. A brake according to claim 1 wherein the brake shoes comprise carriers which are pivotally mounted on the base of the brake, and liner mounting parts which are pivotally secured relative to the carriers, the drum engaging surface of the liner mounting parts at least partly arcuate so as to correspond with the outer configuration of drum with which the shoes engage.

9. A brake according to claim 1 wherein the brake shoe which is engaged by the armature of the electromagnet, receives the connecting element, so as to constrain the movement of the first mentioned brake shoe axially of the drum to be braked.

10. A brake according to claim 1 wherein the brake shoes are each pivotally mounted at or adjacent one end, on the base.

11. A brake comprising a base, a pair of brake shoes, means mounting the brake shoes on the base, a drum to be braked, means resiliently to bias the brake shoes into engagement with the drum to apply the brake, electromagnetic means to move the brake shoes against the resilient biasing means to release the brake, the electromagnetic means comprising an electromagnet having a coil and an armature movable relative to the coil when the coil is energised, the resilient biasing means biasing the armature of the electromagnet into engagement with one of the shoes whilst a housing of the coil of the electromagnet is resiliently biased in an opposite direction by the resilient biasing means, a connecting element connecting the housing and the other of the brake shoes so that the shoes are both oppositely biased into engagement with the drum, and means automatically to maintain the movement of the armature relative to the coil within a predetermined range of movement irrespective of the amount of wear of the brake shoes, the maintaining means comprising lost motion means having a one way clutch mounted adjacent to the electromagnet and operated by a linkage means that is mounted to be pivotable on the housing of the coil and on the armature and automatically varying the effective length of the connecting element by an amount corresponding to the amount of wear of the brake shoes, the linkage means of the lost motion means comprising a first link member pivotally connected at one end to the armature and at the other end to a second link member which itself is pivotally secured to the housing at the coil of the electromagnet, the second link member being rigid with a lever which when rotated at least in one sense of the rotation causes the effective length of the connecting element to be reduced.

12. A brake according to claim 11 wherein the lever operates a peg which is fixed relative to a first part of the lost motion means, a second part of the lost motion means being fixed relative to the connecting element, the first and second parts being freely rotatable only in one sense of rotation such that when the peg is moved by the lever in the opposite sense of rotation the first and second parts move together to cause rotation of the connecting element.

13. A brake according to claim 12 wherein the lost motion means comprises a one way clutch, the first part of the clutch comprising an outer race and the second part an inner race relatively mounted to permit the outer race to free wheel relative to the inner race in one sense of rotation only, the inner race being rigid with the connecting element.

14. A brake according to claim 11 wherein an electromagnet housing in which the coil is fixed, and the armature are pivotally secured relative to the base so that when the coil of the electromagnet is energised, the armature acts on one brake shoe and the housing moves relative to the base away from the armature to actuate the other brake shoe via the connecting element.

* * * * *